United States Patent
Oikawa

(10) Patent No.: US 8,786,973 B2
(45) Date of Patent: Jul. 22, 2014

(54) THERMALLY ASSISTED MAGNETIC RECORDING MEDIUM AND THERMALLY ASSISTED MAGNETIC RECORDING APPARATUS

(75) Inventor: Soichi Oikawa, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/597,042

(22) Filed: Aug. 28, 2012

(65) Prior Publication Data

US 2013/0250449 A1    Sep. 26, 2013

(30) Foreign Application Priority Data

Mar. 23, 2012 (JP) ................................. 2012-067434

(51) Int. Cl.
*G11B 5/02* (2006.01)

(52) U.S. Cl.
USPC .......................................................... 360/59

(58) Field of Classification Search
CPC ...................... G11B 5/1278; G11B 2005/0021; G11B 5/66; G11B 5/667
USPC ......... 360/59, 125.3, 125.12, 110; 428/828.1, 428/820.6, 827, 212, 409, 336, 668, 670, 428/686; 369/13.38, 112.23
See application file for complete search history.

(56) References Cited

U.S. PATENT DOCUMENTS

| | | | |
|---|---|---|---|
| 6,830,824 B2 * | 12/2004 | Kikitsu et al. | 428/828.1 |
| 7,330,335 B2 * | 2/2008 | Kikitsu et al. | 360/125.03 |
| 8,472,140 B2 * | 6/2013 | Yamada et al. | 360/125.3 |
| 2005/0213436 A1 | 9/2005 | Ono et al. | |
| 2009/0059411 A1 | 3/2009 | Tanaka et al. | |
| 2012/0075740 A1 | 3/2012 | Yasumori et al. | |

FOREIGN PATENT DOCUMENTS

| | | |
|---|---|---|
| JP | 2000331303 A | 11/2000 |
| JP | 2001-291222 | 10/2001 |
| JP | 2005-190655 | 7/2005 |
| JP | 2009054867 A | 3/2009 |
| JP | 2010102752 A | 5/2010 |
| JP | 2011216155 A | 10/2011 |
| JP | 2005317178 A | 11/2011 |

OTHER PUBLICATIONS

Japanese Office Action for Japanese Application No. JP2012-067434, dated May 20, 2014.

* cited by examiner

*Primary Examiner* — Nabil Hindi

(74) *Attorney, Agent, or Firm* — Patterson & Sheridan, LLP

(57) ABSTRACT

According to one embodiment, a thermally assisted magnetic recording method performs heating at a temperature higher than the ambient temperature of the perpendicular recording medium and lower than a temperature at which a nucleation magnetic field Hn of the recording portion is 0, decreases a coercive force Hc of a recording portion by heating a perpendicular recording medium, and records magnetic information by applying a recording magnetic field from a recording magnetic pole to the recording portion having the decreased coercive force.

8 Claims, 2 Drawing Sheets

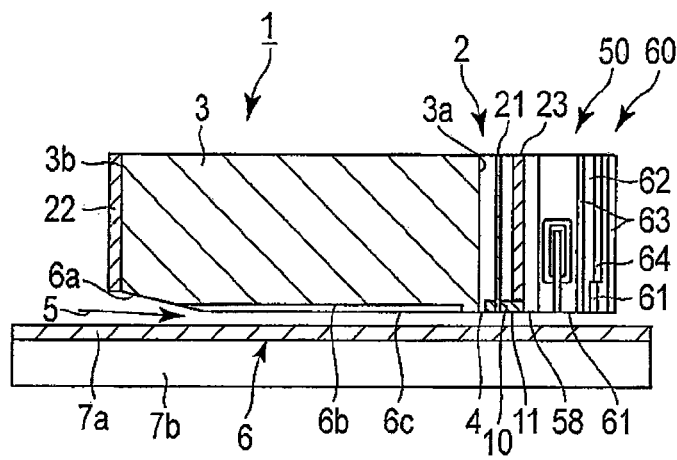
F I G. 1
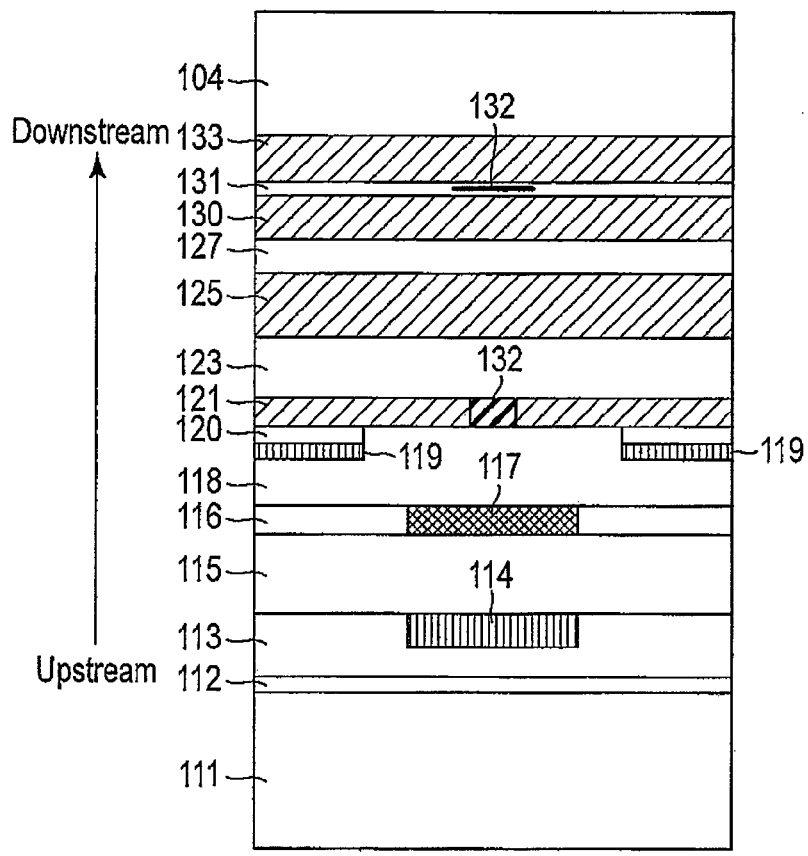
F I G. 2

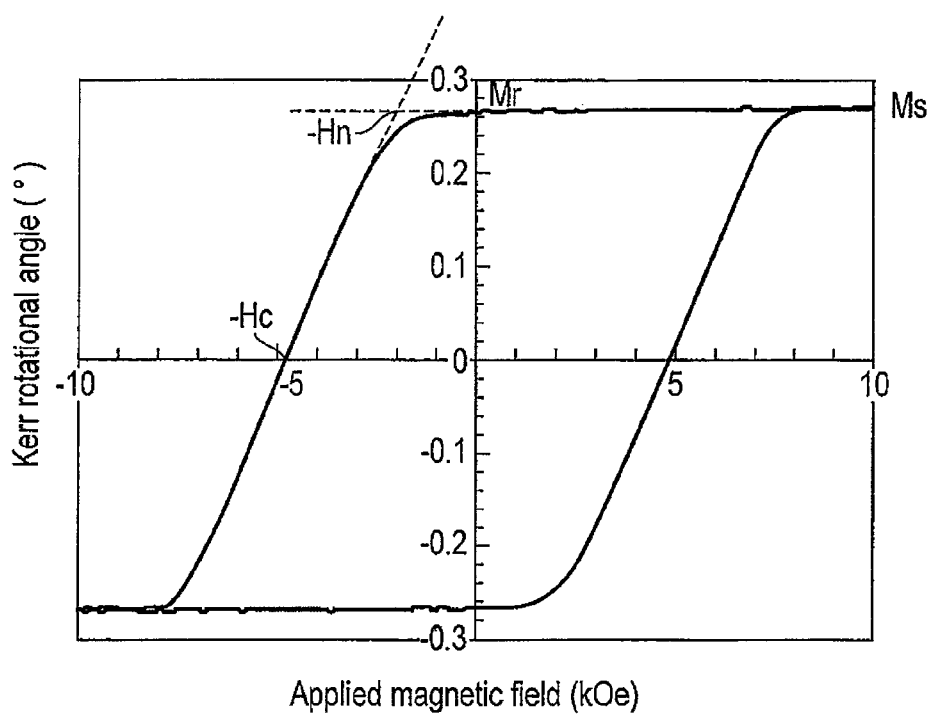
F I G. 3
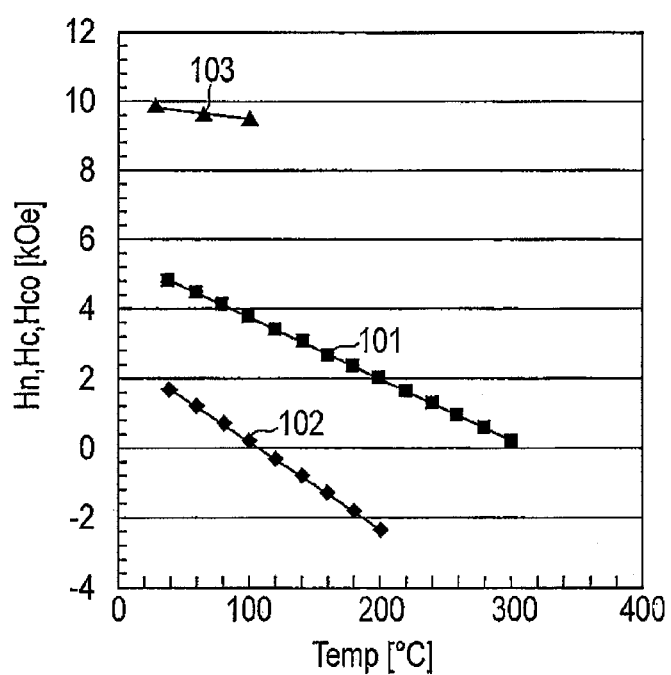
F I G. 4

THERMALLY ASSISTED MAGNETIC RECORDING MEDIUM AND THERMALLY ASSISTED MAGNETIC RECORDING APPARATUS

CROSS-REFERENCE TO RELATED APPLICATIONS

This application is based upon and claims the benefit of priority from Japanese Patent Application No. 2012-067434, filed Mar. 23, 2012, the entire contents of which are incorporated herein by reference.

FIELD

Embodiments described herein relate generally to a thermally assisted magnetic recording method.

BACKGROUND

Magnetic recording apparatuses for magnetically recording and reproducing information keep advancing as large-capacity, high-speed, inexpensive information storage means. In particular, the recent progress of hard disk drives (HDDs) is remarkable. The technique of further increasing the density of the HDD has advanced as a compilation of a plurality of component technologies such as signal processing, mechanical servo, heads, media, and HDI. Recently, however, the thermal stability problem of a medium has become serious as a factor that prevents the development of high-density HDDs.

In magnetic recording using a multi-grain medium formed by a conventional polycrystalline magnetic grain thin film, there is a tradeoff relationship between low noise, a high thermal stability, and a high writability. This is an essential problem that determines the limit of the recording density.

If Ku of a medium magnetic film is increased in order to achieve both a small grain size and high thermal stability, a recording coercive force Hc0 of the medium, i.e., the coercive force when a magnetic head performs high-speed magnetization reversal rises, and a magnetic field necessary for saturation recording increases in proportion to Hc0.

The recording magnetic field generated from the recording head and applied to the medium depends on, for example, the recording magnetic pole material, magnetic pole shape, spacing, medium type, and film thickness, in addition to an electric current to be supplied to a recording coil. Since, however, the size of the distal end portion of the recording magnetic pole decreases as the density increases, the magnitude of the generated magnetic field is limited, and at most about 15 kOe.

Recently, the increase in Hc0 and the decrease in head magnetic field are making recording difficult, and an overwrite OW used as an index of the degree of recording, i.e., a value indicating the degree of erasure of previous magnetization information by overwriting is becoming worse. In particular, even within the range of 5° C. to 55° C. as the operating temperature of the HOD, Hc0 increases as the temperature decreases. Therefore, OW worsens as the temperature decreases.

The existing CoCrPt-based magnetic recording layer shows a very high SNR, so it is extremely difficult to replace this material with another material. It is still possible to increase Ku and Hco of this magnetic recording layer by, for example, changing the composition, and recording is possible near room temperature unlike when using an FePt ordered alloy.

When locally heating the medium as described above by using some means, OW can be improved by decreasing Hc0 of the heated portion.

One method is the thermally assisted magnetic recording method.

In the thermally assisted magnetic recording method using a multi-grain medium, it is possible, by using fine magnetic grains that sufficiently reduce noise, to use a recording layer having a high Ku near room temperature in order to secure a high thermal stability. A medium having a high Ku like this is incapable of recording near room temperature because the magnetic field necessary for recording becomes larger than the generated magnetic field of a recording head. In the thermally assisted magnetic recording method, however, a heating means using an optical beam or the like is installed near the recording magnetic pole, and recording is performed by locally heating a medium such that Hc0 of the heated portion becomes lower than the recording magnetic field from the head.

Thermally assisted magnetic recording has the following problems.

First, it is difficult to decrease the beam diameter to about 100 nm in order to perform local heating at about 300° C. If the beam diameter is not decreased, the efficiency decreases, so a higher power is necessary.

To increase the recording density in the line direction, the temperature gradient must be increased, but this is also difficult.

If the temperature gradient is not increased in the track direction, information on an adjacent track is easily lost.

It is necessary to align the positions of the temperature gradient and magnetic field gradient by positioning the heating source and recording magnetic pole as close as possible. However, this is also very difficult to achieve.

This alignment becomes more difficult as the bit size and beam size decrease, and when skew is taken into consideration.

Examples of assumed media are FePt and CoPt ordered alloys and Co/Pt and Co/Pd multilayers each having a high Ku. When using an unprocessed continuous medium such as a bit patterned medium, however, it is difficult to secure a high SNRm like that of the existing CoCrPt alloy-based granular medium.

A method of forming a heat sink for cooling without diffusing the heat on the medium side in order to increase the temperature gradient as described above has been proposed. However, the grain size and crystal alignment of the magnetic recording layer decrease if it becomes impossible to form a thick nonmagnetic interlayer that is indispensable in the conventional polycrystalline perpendicular medium, and a soft magnetic underlayer is practically omitted. This makes it impossible to reflux the magnetic flux of a head, and decreases the magnetic field gradient.

Since heating to about 300° C. modifies or evaporates a lubricant, it is also necessary to change the lubricant.

Although it may not be necessary to raise the temperature as high as the Curie point, the above-mentioned problems remain almost unchanged when heating is performed at 200° C. or more.

BRIEF DESCRIPTION OF THE DRAWINGS

FIG. 1 is a sectional view showing the main parts of an example of a floating recording head usable in a thermally assisted magnetic recording apparatus according to an embodiment;

FIG. 2 is a view showing an outline of the arrangement of an example of a thermally assisted magnetic recording head usable in the embodiment;

FIG. 3 shows magnetization curves representing the relationship between the applied magnetic field and Kerr rotational angle of a medium; and FIG. 4 is a graph showing the temperature dependence of Hc and Hc0.

DETAILED DESCRIPTION

In general, according to one embodiment, a thermally assisted magnetic recording method is characterized by decreasing a coercive force Hc of a recording portion by heating a perpendicular recording medium at a temperature higher than the ambient temperature of the perpendicular recording medium and lower than a temperature at which a nucleation magnetic field Hn of the recording portion is 0, and recording magnetic information by applying a recording magnetic field from a recording magnetic pole to the recording portion having the decreased coercive force.

A magnetic recording layer used in the perpendicular recording medium can contain a CoCrPt alloy as a main component, and have a multi-grain structure.

The multi-grain structure is a structure in which magnetic grains are magnetically isolated.

An optical beam or electron beam can be used as the heating means.

A semiconductor layer can be used as a heating source.

The semiconductor laser need not use any mechanism for decreasing the beam diameter of a laser beam.

When the beam diameter of the semiconductor laser is not decreased, the length of the heated region in the track width direction may become larger than the recording track width.

The semiconductor laser is installed closer to the leading side than the recording magnetic pole, and the exit hole opposes the surface of the above-mentioned magnetic recording medium.

A magnetic recording/reproduction apparatus according to the embodiment is characterized by including a heating source for heating a recording portion of a perpendicular recording medium at a temperature higher than the ambient temperature of the perpendicular recording medium and lower than a temperature at which the nucleation magnetic field Hn of the recording portion is 0, and a head having a recording magnetic pole for recording magnetic information by applying a recording magnetic field to the recording portion having the coercive force Hc decreased by heating by the heating source, wherein the temperature is raised by heating.

The magnetic recording/reproduction apparatus according to the embodiment can also include the above-mentioned head, a temperature measurement unit for measuring the temperature of the recording portion of the perpendicular recording medium, and a heating controller for controlling heating by the heating source in accordance with temperature information from the temperature measurement unit, such that the temperature of the recording portion is higher than the ambient temperature and lower than the temperature at which the nucleation magnetic field Hn of the recording portion is 0.

The thermally assisted magnetic recording method and thermally assisted magnetic recording apparatus according to the embodiment can improve the overwrite (OW) by heating a CoCrPt-based medium at a temperature lower than the temperature at which the Hn is 0. Also, the embodiment can provide a highly practical HDD including an easily manufacturable head, because the beam diameter need not be decreased.

Note that when the Hn is larger than 0, the perpendicular squareness ratio is almost 1. Therefore, even in a region of, for example, servo patterns where the demagnetizing field is large and magnetization reversal occurs most easily, the residual magnetization is kept saturated when an external magnetic field is 0, i.e., the reproduction output does not decrease due to the generation of a reverse magnetic domain.

For example, when heating is performed to about 60° C. to 100° C. without narrowing the beam, it is presumably possible to solve the problems such as the adjustment of the temperature gradient and magnetic field gradient, the SNRm, and the modification of the lubricant. A normal operating temperature of the HDD is 5° C. to 55° C., and OW deteriorates at a low temperature even within this range. When only heating the recording portion to 55° C., therefore, it is possible to perform temperature compensation that improves the low-temperature OW within a range in which no new large problem arises. Also, even when anisotropic magnetic fields Hk, Hco, and Hn increase within the range of a normal CoCrPt-based medium, it is only necessary to compensate for OW accordingly by raising the heating temperature. This makes it possible to increase Ku and thermal stability. When Ku can be increased, the grain size can be decreased, so the recording density increases. Since the temperature is not excessively raised, the beam diameter need not be decreased, and this facilitates manufacturing the head. The feasibility is higher than that of thermally assisted magnetic recording performed at a temperature higher than the temperature at which the Hn is 0.

The embodiment will be explained below with reference to the accompanying drawings.

FIG. 1 is a sectional view showing the main parts of an example of a floating recording head usable in the thermally assisted magnetic recording apparatus.

As shown in FIG. 1, a floating recording head 1 has a structure in which a semiconductor laser oscillator 2 including a light-shielding member 11 having an opening 10 is stacked on a rear end face 3a of a conductive GaN substrate 3, and a thin-film magnetic transducer 50 is stacked on the semiconductor laser oscillator 2. In addition, a slider surface 6 is formed on the bottom surface, so the floating recording head 1 can move on a recording medium 7a of an optical disk 7 with a laser beam and magnetic gap being close to each other. This enables laser-assisted magnetic recording to a magnetic recording film or magneto-optical recording film. Furthermore, a magnetic sensor 60 formed by a GMR sensor is stacked on the thin-film magnetic transducer 50. This makes it possible to perform laser-assisted magnetic recording to a magnetic recording film or magneto-optical recording film, and signal reproduction by the magnetic sensor 60. The magnetic sensor 60 includes a spin valve film 61 and electrode 64 sandwiched between magnetic shielding layers 63 made of two soft magnetic films, with an insulating layer 62 being interposed between them, and performs signal reproduction by detecting the change in resistance of the spin valve film 61 caused by the change in magnetic field entering from the recording medium. In the embodiment, the magnetic sensor 60 is formed on the thin-film magnetic transducer 50 in order to avoid the influence of heat generation of the semiconductor laser oscillator 2 on the magnetic sensor 60. That is, this structure is an inversion of the conventional magnetic head structure.

The structural bases of the thermally assisted magnetic recording apparatus according to the embodiment are (1) the light-emitting element and magnetic recording element are integrated, (2) the light-emitting element and recording magnetic pole are stacked in this order from the upstream side in a direction in which the medium moves, and (3) the light-emitting portion and recording magnetic pole are arranged close to each other.

(1) Since the light-emitting element and magnetic recording element are integrated, it is possible to perform a high-speed seek operation of the head by omitting a heavy optical system having a complicated structure, and use a semiconductor laser of a few ten mW by making the light utilization efficiency much higher than that of a light irradiation method using a waveguide or fiber. A recording magnetic field can be supplied at the timing at which Hc0 of the medium is sufficiently low because (2) the light-emitting element and recording magnetic pole are stacked in this order from the upstream (leading) side in the medium moving direction, and (3) the light-emitting portion and recording magnetic pole are arranged close to each other.

An example of (3) a means for arranging the light-emitting portion and recording magnetic pole close to each other is a structure in which the recording magnetic pole is positioned on the downstream (trailing) side of the light-emitting element when viewed from the medium surface. That is, when moving toward the head, the medium meets the light-emitting element and recording magnetic pole in this order.

On the other hand, there are several examples of a form using near field light (evanescent light). A typical example is a form in which after the exit surface of a semiconductor laser is covered with a, reflecting film, a micro hole (optical aperture) of a few ten nm to a few hundred nm is formed in the exit surface, and near field light is formed in the hole. In this form, the light utilization efficiency decreases as the size of the micro hole decreases, so a required value of the light source power increases as the recording density increases. However, a head can be provided at a low cost because the structure is simplest.

The embodiment will be explained in detail below by way of its examples.

EXAMPLE

FIG. 2 is a view showing an outline of the arrangement of a thermally assisted magnetic recording head according to an example. Note that this example uses neither a near field optical aperture nor a converging lens system.

FIG. 2 shows the main constituent parts of the thermally assisted magnetic head. The constituent elements of the head are a semiconductor laser light-emitting element portion including elements 111 to 119, a magnetic recording element portion including elements 120 to 127, a magnetic reproducing element portion including elements 130 to 133, and a protective coating portion 104.

In the head of this example as shown in FIG. 2, the light-emitting element portion, magnetic recording element portion, and magnetic reproducing element portion are arranged in this order from the upstream (leading) side. "Upstream (leading)" and "downstream (trailing)" herein mentioned mean that the medium performs recording and reproduction as it moves from the upstream side to the downstream side with respect to the head. Note that in order to avoid complexity, FIG. 2 does not show any elements having no immediate relation to the embodiment, for example, a detailed structure of the reproducing element portion, and the structure of an electrode extracting portion.

In the semiconductor light-emitting element portion shown in FIG. 2, reference numeral 111 denotes a substrate; 112, a buffer layer for lattice matching, for example, a GaAs layer about a few µm thick; 113, p-type layer, for example, a p-type GaAs layer about 200 nm thick; 114, a striped multilayered metal electrode, for example, a Ti/Pt/Au multilayered film about 1 µm wide and 100 nm thick (total thickness); 115, a p-type cladding layer, for example, a p-type AlGaInP layer about 1 µm thick; 116, an active layer, for example, a GaInP layer about 100 nm thick; 117, a resonant region (light-emitting region) in the active layer; 118, an n-type cladding layer, for example, an n-type AlGaInP layer about 1 µm thick; and 119, an electrode, for example, an AuGe/Au multilayered film about 100 nm thick.

In the above arrangement, the light-emitting for exampleion has a rectangular shape having a width of about 1 µm, and a dimension of about a few hundred nm as an active layer thickness in the track direction. As will be described later, the spacing between the light-emitting surface 117 and medium is about a few ten nm. A beam profile obtained on the medium surface by simulation had an elliptical shape having an e-2 diameter of about 1 µm in the track width direction and about 200 nm in the track direction. Although the relationship between the beam diameter in the track direction and the active layer thickness depends on the spacing, the beam diameter is about twice the active layer thickness for a spacing of a few ten nm.

In the arrangement of the magnetic recording element portion shown in FIG. 2, reference 120 denotes an insulating film, for example, 100-nm thick $SiO_2$; 121, an upstream-side magnetic pole, for example, 200-nm thick FeCo film; 122, a recording magnetic pole distal end portion, for example, a distal end portion having an end width of 0.1 µm and a depth of 0.1 µm; 123, an insulator, for example, a resist frame; 124, a recording magnetic field generation coil, for example, a three-turn Cu coil; 125, a return-path magnetic pole, for example, a 1-µm thick NiFe film; 126, a junction portion between the upstream-side magnetic pole and return-path magnetic pole; and 127, an insulating film, for example, 500-nm thick $SiO_2$.

In the magnetic reproduction element portion shown in FIG. 2, reference numeral 130 denotes an upstream-side shield, for example, 500-nm thick NiFe; 131, a reproduction gap, for example, $SiO_2$ having an inter-shield thickness of 200 nm (a gap between a shield and GMR, i.e., the reproduction gap is 100 nm); 132, a GMR reproduction element portion, for example, a CoFe/Cu/CoFe/FeMn multilayered film; and 133, a downstream-side shield, for example, 500-nm thick NiFe. Although not shown in FIG. 2, the two ends of the GMR element are connected to a hard bias film, for example, CoCrPt, and a metal electrode film. Reference numeral 104 denotes a protective film of the whole head. For example, an $Al_2O_3$ film having a film thickness of a few ten µm can be used.

The medium used had a structure in which a magnetic recording layer, for example, a 15-nm thick $CoPtCr—SiO_2$/CoCrPt perpendicular magnetization, multi-grain magnetic recording layer was stacked on a soft magnetic underlayer, for example, 40-nm thick CoTaZr.

Before conducting recording/reproduction experiments, the composition, microstructure, and magnetic characteristics of the medium according to the present invention were checked.

When planar TEM analysis was performed on a $CoPtCr—SiO_2$ layer deposited under typical conditions, the layer had a structure in which CoPtCr crystal grains having an average grain size of about 7 nm were divided by a 1- to 2-nm thick amorphous grain boundary layer. Also, the packing ratio of the CoPtCr grains was about 60%. In addition, when sectional TEM analysis was performed, crystal grains in a CoCrPt layer stacked on this layer were found to have grown on the CoPtCr grains in the lower layer. Furthermore, the grains in the CoCrPt layer were also divided, but the grain boundary layer thickness was smaller than that in the CoPtCr—SiO$_2$ layer.

The magnetic characteristics were measured using a torque meter, VSM, and Kerr effect measurement device. Typical magnetic characteristics at room temperature (to 300 K) were that Ku was $4\times10^6$ erg/cc, the Ms was 500 emu/cc, and Hc was 5 kOe.

FIG. 3 shows magnetization curves representing the relationship between the applied magnetic field and Kerr rotational angle of the medium.

As shown in FIG. 3, a nucleation magnetic field -Hn is defined by the intersection of extensions of intercepts of a line passing through residual magnetization Mr of a magnetization curve when a magnetic field is applied in the opposite direction, and a line passing through a coercive force -Hc.

The Kerr effect measurement device requires a time of about 1 min for loop measurement. Therefore, Hc obtained from a Kerr loop is a coercive force obtained after thermal agitation for about 1 min at the same temperature. On the other hand, a coercive force Hc0 affecting recording is a magnetic field required for a high-speed magnetization reversal of about 1 ns when actually performing recording by the head, and this means a magnetic field required to perform magnetization reversal within a time almost unaffected by thermal agitation. A head magnetic field necessary for recording is a medium saturation magnetic field Hs0 for high-speed magnetization reversal. Since the Hs0 and Hc0 are almost proportional, however, this embodiment will be explained by using Hc0 as a magnetic field necessary for recording.

FIG. 4 is a graph showing the temperature dependence of Hc and Hn actually measured by Kerr and Hc0 estimated by the Sharrock's expression.

In FIG. 4, reference numerals 101, 102, and 103 respectively denote Hc, Hn, and Hc0.

The magnetic characteristics changed as functions of the temperature, and monotonically decreased from room temperature toward high temperatures. Hc became 0 at about 300° C., but was about 4 kOe, i.e., decreased by about only 20% when the Hn became 0 at about 100° C. Note that KuV/kT obtained at room temperature was about 80, indicating that the medium used in this example had a sufficient thermal stability near room temperature.

The medium having the magnetic characteristics described above and a normal magnetic head were set in a spin stand magnetic recording/reproduction evaluation apparatus. The head position was fixed, and an additional laser source was used to emit light in the transverse direction of the head, such that the laser beam (the diameter was about 1 μm) irradiated a position (a gap between a suspension and the medium) before the slider on the upstream (leading) side. Also, a set including the head, medium, and laser was placed in a thermostat apparatus so that the measurement ambient temperature was changeable. While the environmental temperature and laser heating conditions were thus changed, OW the ATE (a phenomenon in which an on-track signal is erased when a signal is recorded on an adjacent track), and the like were checked when a 750 kFCI (a recording density at which a magnetic flux changes 750,000 times per inch) signal was overwritten with a 100 kFCI signal.

EXAMPLE 1

OW improved when laser irradiation was started in an ambient at an environmental temperature of 5° C. and measurement was performed while the optical output power was gradually raised. When the power was 5 mW, the same OW of −30 dB as that when the environmental temperature was 55° C. was obtained. At the same time, the recording track width and ATE were checked, and almost the same results as when the temperature was 55° C. were obtained. Therefore, the periphery of the recording region on the medium was presumably heated to about 55° C. by performing laser irradiation at a power of 5 mW.

Almost the same effect as that when the environmental temperature was changed was obtained probably because the heated region was much wider than the recording track width. Also, the expected effect was obtained perhaps because the temperature drop was slow when the heating temperature was low, although the portion irradiated with the laser beam was spaced apart by 1 mm or more from the recording magnetic pole. In other words, the heating region and recording magnetic pole can be separated from each other to some extent. A small temperature gradient is also a feature, and magnetization transition is determined by a magnetic field gradient in the same manner as in recording without heating.

When the laser source is incorporated into the head as described above, not only the same effect can be expected, but also a seek operation is possible, adverse effects on the periphery reduce even when the temperature is raised because the heating region is narrowed, and unnecessary heating need not be performed because the heating region and recording magnetic pole are arranged close to each other.

In a form in which heating is performed by light irradiation on the upstream side at which the medium passes by the lower portion of the recording magnetic pole and recording is performed after a magnetic field necessary for recording by the medium is decreased in accordance with this embodiment, OW can be improved at a temperature lower than the temperature at which the Hn is 0, within a practical light intensity range and practical recording current range.

COMPARATIVE EXAMPLE 1

When OW was measured without laser heating, OW was about −25 dB at room temperature, i.e., recording was possible. OW improved to −30 dB at an environmental temperature of 55° C., but deteriorated to −20 dB at an environmental temperature of 5° C.

EXAMPLE 2

When the optical output power was 4 mW at an environmental temperature of 55° C. and 9 mW at an environmental temperature of 5° C., OW improved to −50 dB, and there was no adverse effect such as a decrease in reproduction output or deterioration of the ATE.

COMPARATIVE EXAMPLE 2

On the other hand, the reproduction output decreased and the ATE deteriorated when the optical output power was 5 mW or more at an environmental temperature of 55° C. and raised to 10 mW or more at an environmental temperature of 5° C.

These results indicate the following. Under the irradiation conditions of the examples, it was possible to heat the recording region and its periphery on the medium to nearly 100° C. Under the irradiation conditions of the comparative examples, the recording region and its periphery on the medium exceeded 100° C., and the Hn became negative as shown in FIG. 4. This probably caused the generation of a reverse magnetic domain and the demagnetization of an adjacent track.

A temperature at which the Hn was 0 was about 100° C. in this medium, but this temperature changes in accordance with medium design. Therefore, it is appropriate to regard that the heating temperature range is not the absolute value of the temperature but a temperature at which the Hn does not become negative. In other words, OW can be improved without any adverse effects when heating is performed within a range in which the Hn is positive.

EXAMPLE 3

A medium having an increased thermal stability was manufactured by increasing the Pt composition and reducing the Cr composition in the magnetic recording layer. In this medium, Ku was $5\times10^6$ erg/cc, the Ms was 600 emu/cc, Hc was 6 kOe, a temperature at which the Hn was 0 was 150° C., and KuV/kT was 100. The same experiments as those of Example 1 were conducted except that the medium was changed.

When the optical output power was 9 mW at an environmental temperature of 55° C. and raised to 14 mW at an environmental temperature of 5° C., OW improved to −50 dB, and an adverse effect such as a decrease in reproduction output or deterioration of the ATE was not observed.

COMPARATIVE EXAMPLE 3

On the other hand, the reproduction output decreased and the ATE deteriorated when the optical output power was 10 mW or more at an environmental temperature of 55° C. and raised to 15 mW or more at an environmental temperature of 5° C.

That is, even when Ku is raised in order to increase the thermal stability, a sufficient OW can be ensured without any adverse effects by raising the heating temperature within the range in which the Hn is positive. Also, since KuV/kT was 100, the same thermal stability as that in Example 1 can be obtained even when a volume V of the magnetic grains in the magnetic recording layer is reduced by about 20%. When the magnetic grains are downsized, the signal-to-noise ratio and bit error rate improve as is well known, so the recording density can be increased.

The experiments described above were conducted by using the spin stand, external laser source, and constant-temperature bath. However, the same effects as those of the above-mentioned examples can be expected even in a magnetic recording/reproduction apparatus by incorporating a temperature sensor and a head including a laser source in the apparatus, and controlling the laser output in accordance with the temperature of the apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A thermally assisted magnetic recording method, comprising:
    decreasing a coercive force Hc of a recording portion by heating a perpendicular recording medium; and
    recording magnetic information by applying a recording magnetic field from a recording magnetic pole to the recording portion having the decreased coercive force,
    wherein the heating is performed at a temperature higher than an ambient temperature of the perpendicular recording medium and lower than a temperature at which a nucleation magnetic field Hn of the recording portion is 0, and
    wherein the perpendicular recording medium includes a magnetic recording layer with a multi-grain structure in which magnetic grains are magnetically isolated.

2. The method according to claim 1, wherein a dimension of a heated region in a track width direction is larger than a recording track width.

3. The method according to claim 1, wherein the magnetic recording layer contains a CoCrPt alloy as a main component.

4. A thermally assisted magnetic recording apparatus comprising:
    a heating source configured to heat a recording portion of a perpendicular recording medium; and
    a head including a recording magnetic pole configured to record magnetic information by applying a recording magnetic field to the recording portion having a coercive force Hc decreased by heating by the heating source,
    wherein the heating is performed at a temperature higher than an ambient temperature of the perpendicular recording medium and lower than a temperature at which a nucleation magnetic field Hn of the recording portion is 0, and
    wherein the perpendicular recording medium includes a magnetic recording layer with a multi-grain structure in which magnetic grains are magnetically isolated.

5. The apparatus according to claim 4, wherein the magnetic recording layer contains a CoCrPt alloy as a main component.

6. The apparatus according to claim 4, wherein the heating source is a semiconductor laser.

7. The apparatus according to claim 6, wherein the semiconductor laser is installed closer to a leading side than the recording magnetic pole, and an exit hole opposes a surface of the magnetic recording medium.

8. The apparatus according to claim 6, wherein a dimension of a beam of the semiconductor laser in a track width direction is larger than a recording track width.

* * * * *